United States Patent
Kim et al.

(10) Patent No.: US 11,122,545 B2
(45) Date of Patent: Sep. 14, 2021

(54) METHOD FOR ALLOCATING RESOURCE FOR SIGNAL BY TERMINAL IN WIRELESS COMMUNICATION SYSTEM AND APPARATUS THEREFOR

(71) Applicant: LG Electronics Inc., Seoul (KR)

(72) Inventors: Youngtae Kim, Seoul (KR); Seungmin Lee, Seoul (KR); Hanbyul Seo, Seoul (KR); Jongyoul Lee, Seoul (KR); Hyukjin Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 26 days.

(21) Appl. No.: 16/613,237

(22) PCT Filed: May 17, 2018

(86) PCT No.: PCT/KR2018/005654
§ 371 (c)(1),
(2) Date: Nov. 13, 2019

(87) PCT Pub. No.: WO2018/212605
PCT Pub. Date: Nov. 22, 2018

(65) Prior Publication Data
US 2020/0178212 A1 Jun. 4, 2020

Related U.S. Application Data

(60) Provisional application No. 62/507,804, filed on May 18, 2017.

(51) Int. Cl.
*H04W 72/02* (2009.01)
*H04W 72/04* (2009.01)

(52) U.S. Cl.
CPC ....... *H04W 72/02* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2008/0233992 A1* | 9/2008 | Oteri | H04W 52/365 455/522 |
| 2017/0099624 A1 | 4/2017 | Baghel et al. | |
| 2017/0201461 A1* | 7/2017 | Cheng | H04L 43/16 |

FOREIGN PATENT DOCUMENTS

| | | |
|---|---|---|
| WO | 2016028126 A1 | 2/2016 |
| WO | 2016159712 A1 | 10/2016 |

OTHER PUBLICATIONS

R1-1705695: 3GPP TSG RAN WG1 Meeting #88bis, Spokane, USA, Apr. 3-7, 2017, NTT Docomo, Inc., "On carrier aggregation for sidelink V2x," pp. 1-3.

(Continued)

*Primary Examiner* — Ayanah S George
(74) *Attorney, Agent, or Firm* — Dentons US LLP

(57) ABSTRACT

The present invention relates to a method and an apparatus for allocating a resource by a terminal in a wireless communication system supporting carrier aggregation. Specifically, the method comprises the steps of: receiving a configuration of a resource pool for signal transmission; and allocating at least one message to at least one resource unit on the basis of the resource pool, wherein the allocated resource unit is selected on the basis of the transmission capability of a terminal. The terminal is capable of communicating with at least one of another UE, a UE related to an autonomous driving vehicle, a base station or a network.

6 Claims, 10 Drawing Sheets

(56) References Cited

OTHER PUBLICATIONS

R1-1708942: 3GPP TSG RAN WG1 Meeting #89, Hangzhou, China, May 15-19, 2017, Ericsson, "Radio resource pool sharing between mode 3 and mode 4 UEs," pp. 1-4.
R1-1707300: 3GPP TSG RAN WG1 Meeting #89, Hangzhou, P.R. China May 15-19, 2017,Intel Corporation, "Sidelink carrier aggregation for LTE V2V communication," pp. 1-8.
International Search Report from PCT/PCT/KR2018/005654, dated Sep. 6, 2018.
Written Opinion of the ISA from PCT/PCT/KR2018/005654, dated Sep. 6, 2018.
Samsung, "Priority Handling for D2D Communication", 3GPP TSG RAN WG2 Meeting #91, Aug. 24-28, 2015, R2-153099.

* cited by examiner

FIG. 2
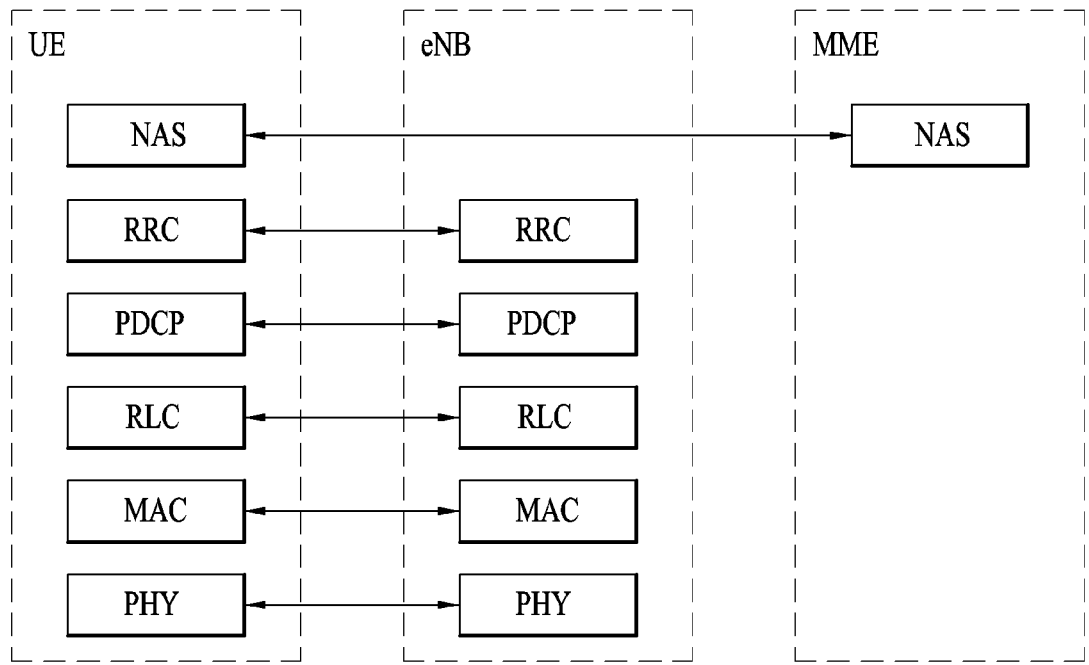
(a) Control-plane protocol stack
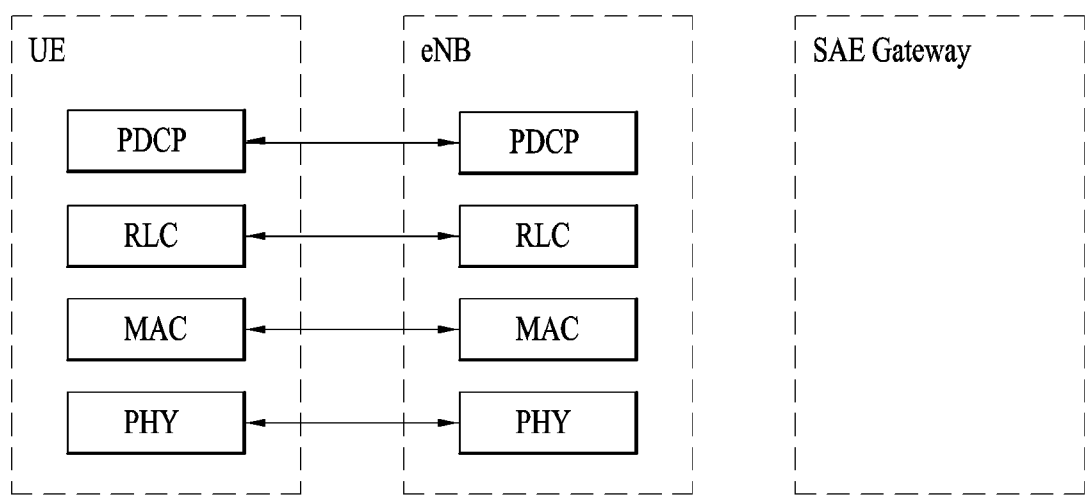
(b) User-plane protocol stack

FIG. 8
(a)
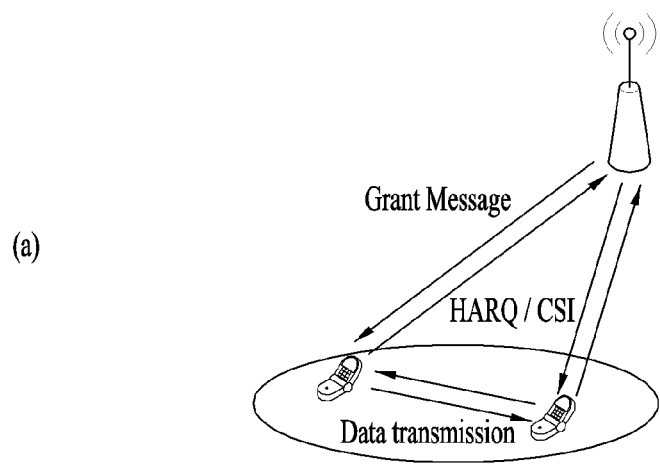
(b)
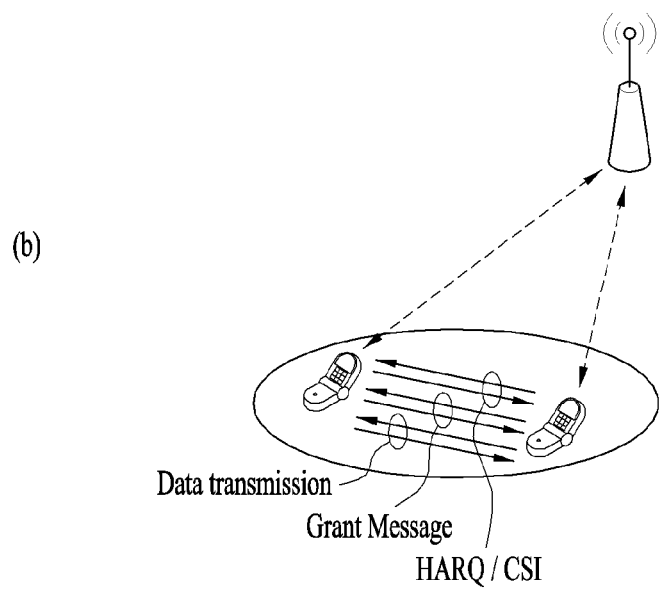

METHOD FOR ALLOCATING RESOURCE FOR SIGNAL BY TERMINAL IN WIRELESS COMMUNICATION SYSTEM AND APPARATUS THEREFOR

This application is a National Stage Entry of International Application No. PCT/KR2018/005654 filed May 17, 2018, which claims the benefit of U.S. Provisional Application No. 62/507,804 filed May 18, 2017, all of which are hereby incorporated by reference in their entirety for all purposes as if fully set forth herein.

TECHNICAL FIELD

The present invention relates to a wireless communication system, and more particularly, to a method for allocating a resource for a signal by a terminal and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE

Technical Problem

Based on the discussion above, a method for allocating a resource for a signal by a terminal in a wireless communication system and an apparatus therefor are proposed.

Technical tasks obtainable from the present invention are non-limited by the above-mentioned technical task. And, other unmentioned technical tasks can be clearly understood from the following description by those having ordinary skill in the technical field to which the present invention pertains.

Technical Solution

In one aspect of the present invention, provided herein is a method for allocating resources by a terminal in a wireless communication system supporting carrier aggregation, the method including receiving a configuration of a resource pool for signal transmission, and allocating at least one message to one or more resource units based on the resource pool, wherein the allocated resource units are selected based on a transmission capability of the terminal.

Further, when not all the at least one message is allowed to be transmitted due to a limitation of the transmission capability of the terminal, only a resource for a message corresponding to a resource unit of a specific frequency region between the at least one message in the allocated resource units may be selected.

Further, the resource selected for the message corresponding to the resource unit of the specific frequency region may be selected based on at least one of a ProSe per-packet-priority (PPPP) or a channel busy ratio (CBR).

Further, the resource selected for the message corresponding to the resource unit of the specific frequency region may be configured differently according to the specific frequency region.

Further, any message corresponding to a frequency region other than the specific frequency region among the at least one message may be dropped.

Further, the one or more resource units are distinguished by a frequency region.

In another aspect of the present invention, provided herein is a terminal for allocating resources in a wireless communication system supporting carrier aggregation, the terminal including a radio frequency unit, and a processor, wherein the processor is configured to receive a configuration of a resource pool for signal transmission, and allocate at least one message to one or more resource units based on the resource pool, wherein the allocated resource units are selected based on a transmission capability of the terminal.

Advantageous Effects

According to an embodiment of the present invention, resource allocation may be efficiently performed in a wireless communication system.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates control plane and user plane structures of a radio interface protocol between a UE and an E-UTRAN on the basis of the 3GPP wireless access network standard.

FIG. 8 is a reference diagram to describe D2D (UE-to-UE) communication.

BEST MODE

Figure 1:
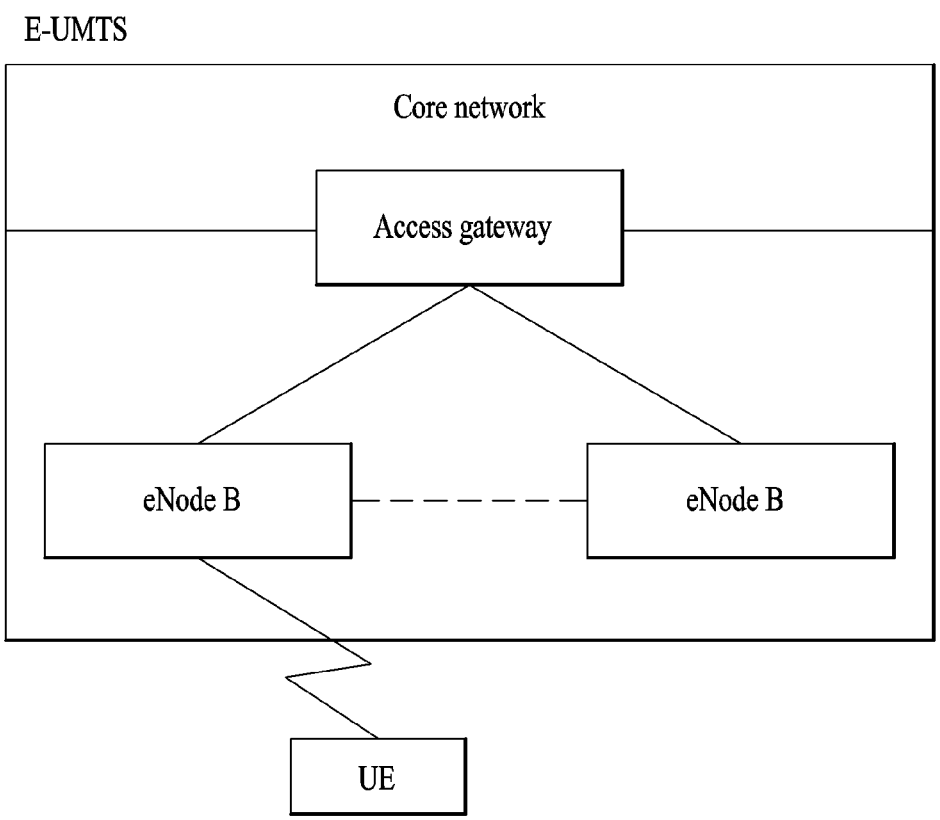
FIG. 1 schematically illustrates an E-UMTS network structure as an example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
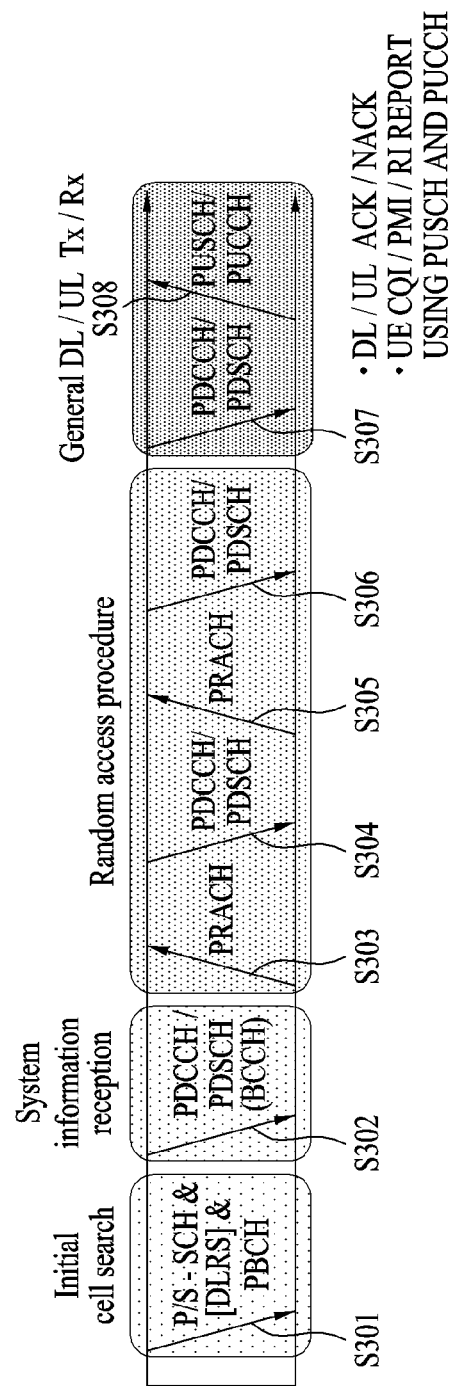
FIG. 3 illustrates physical channels used in a 3GPP system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
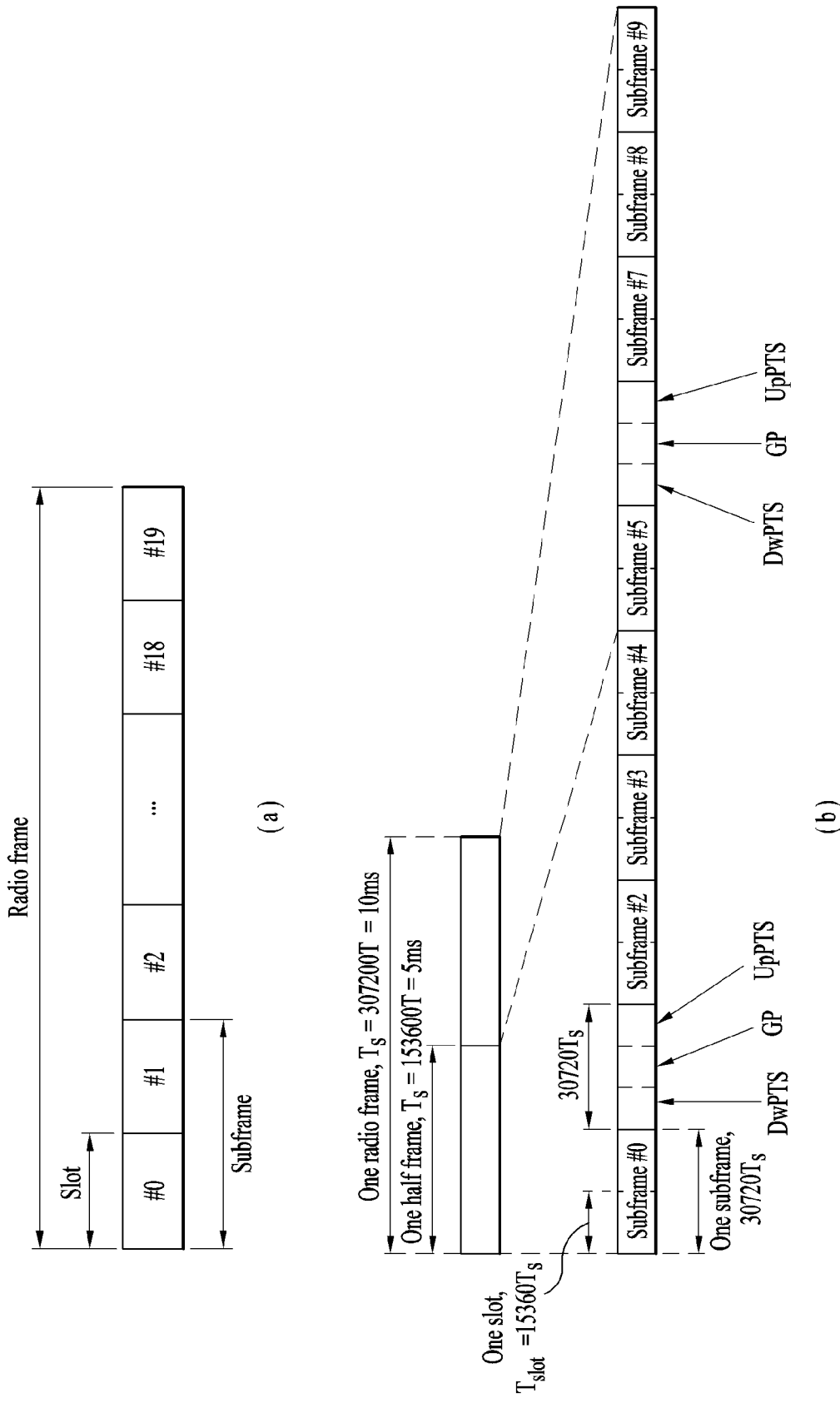
FIG. 4 illustrates a radio frame structure used in LTE.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

The structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
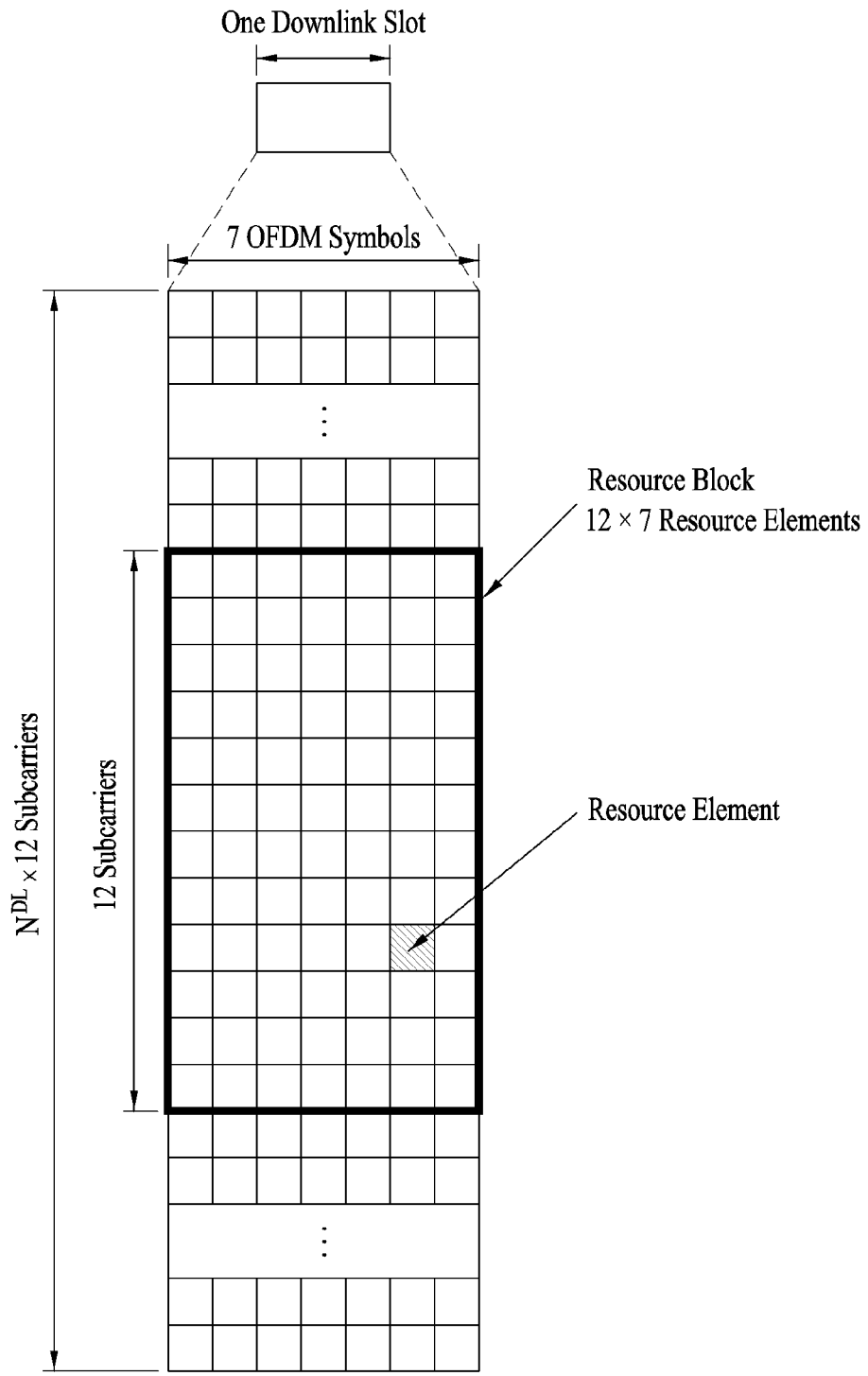
FIG. 5 illustrates a resource grid for a downlink slot.

FIG. 5 illustrates a resource grid for a downlink slot.

Referring to FIG. 5, a DL slot includes $N\_symb^{DL}$ OFDM symbols in a time domain and $N\_RB^{DL}$ resource blocks in a frequency domain. Since each of the resource blocks includes $N\_SC^{RB}$ subcarriers, the DL slot includes $N\_RB^{DL} \times N\_SC^{RB}$ subcarriers in the frequency domain. Although FIG. 5 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N\_symb^{DL} \times N\_SC^{RB}$ resource elements. The number ($N\_RB^{DL}$) of resource blocks included in the DL slot depends on a DL transmission bandwidth configured in a cell.

Figure 6:
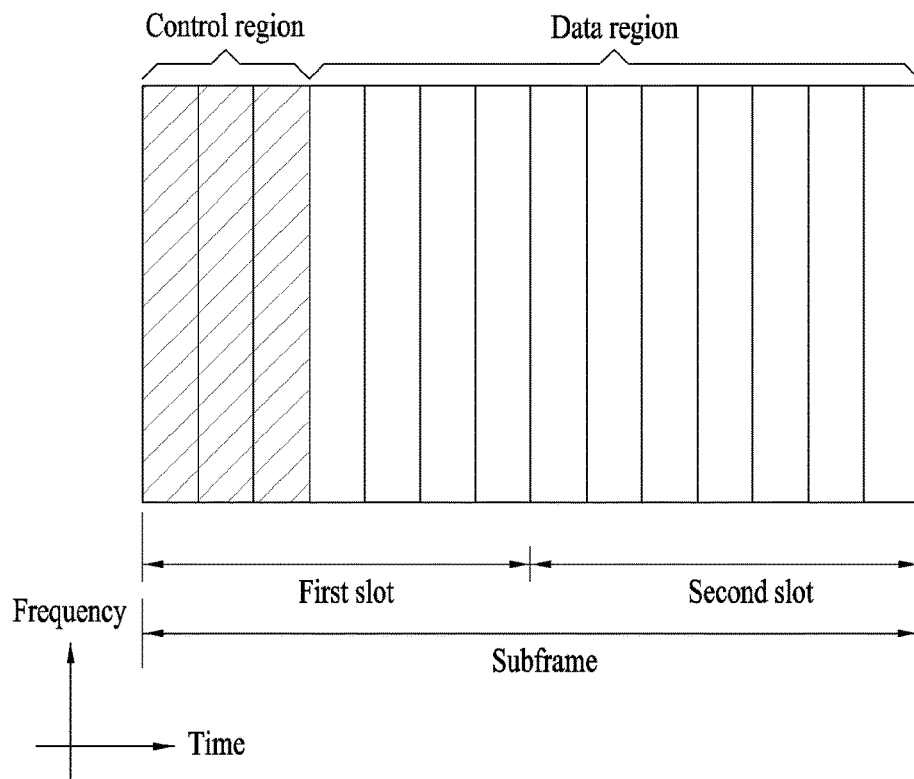
FIG. 6 illustrates a structure of a downlink radio frame used in an LTE system.

FIG. 6 illustrates a structure of a downlink radio frame.

Referring to FIG. 6, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 7:
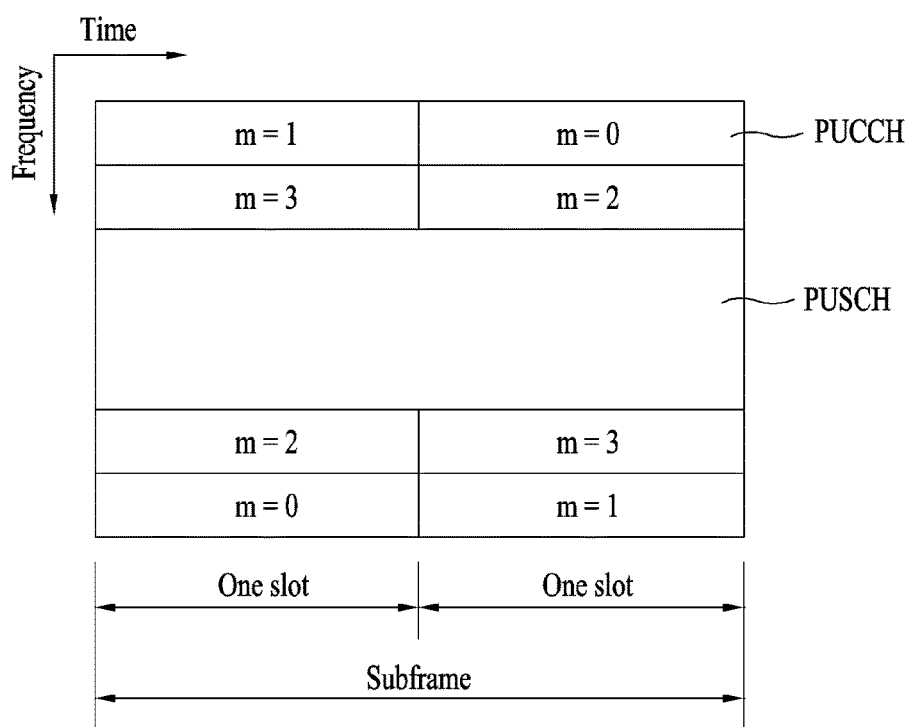
FIG. 7 illustrates a structure of an uplink radio frame used in an LTE system.

FIG. 7 illustrates a structure of an uplink subframe used in an LTE system.

Referring to FIG. 7, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

A D2D communication scheme can be mainly classified as a scheme supported by a network/coordination station (e.g., base station) and a scheme not supported by the network/coordination station.

Referring to FIG. 8, FIG. 8 (a) illustrates a scheme in which the network/coordination station intervenes in transmission and reception of control signals (e.g., grant message), HARQ, channel state information, etc. and user equipments that perform D2D communication transmit and receive data only. On the other hand, FIG. 8 (b) illustrates a scheme in which the network provides minimum information (e.g., D2D connection information available in a corresponding cell) only but the user equipments that perform D2D communication establish links to transmit and receive data.

Figure 9:
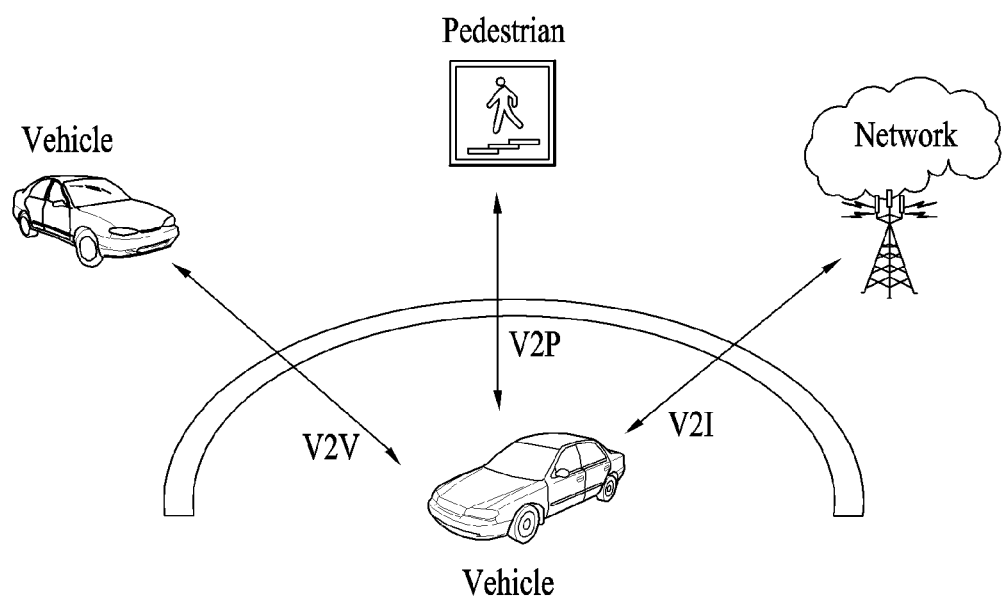
FIG. 9 is a reference diagram to describe a V2V scenario.

FIG. 9 is a diagram illustrating a V2X (vehicle to everything) communication environment.

If a vehicle accident occurs, many lives are lost, and serious property damage is caused. Thus, the demand for a technology capable of securing safety of pedestrians as well as safety of people in a vehicle has been increased. In addition, a technology based on hardware and software dedicated to the vehicle has been grafted onto the vehicle.

Recently, the LTE-based V2X (vehicle-to-everything) communication technology, which has been evolved from 3GPP, reflects the tendency in which the information technology (IT) is grafted onto the vehicle. A connectivity function is applied to some kinds of vehicles, and efforts are continuously made to research and develop vehicle-to-vehicle (V2V) communication, vehicle-to-infrastructure (V2I) communication, vehicle-to-pedestrian (V2P) communication, and vehicle-to-network (V2N) communication with the evolution of communication functions.

According to V2X communication, a vehicle consistently broadcasts information on its own locations, speeds, directions, etc. After receiving the broadcasted information, a nearby vehicle utilizes the information for accident prevention by recognizing movements of other adjacent vehicles.

That is, in a similar manner that an individual person carries a user equipment such as a smartphone, a smartwatch or the like, a specific type of user equipment (UE) can be installed in each vehicle. Here, a UE installed in a vehicle means a device that actually receives communication services from a communication network. For example, the UE installed in the vehicle can be accessed to an eNB in E-UTRAN and provided with communication services.

However, there are various items that should be considered for a process for implementing V2X communication in a vehicle. This is because astronomical costs are required for the installation of traffic safety facilities such as a V2X base station and the like. That is, to support V2X communication on all roads where the vehicle can move, it is necessary to install hundreds or thousands of V2X base stations or more. Moreover, since each network node accesses the Internet or a centralized control server using a wired network basically for stable communication with a server, installation and maintenance costs for the wired network are also high.

Hereinafter, resource allocation for performing V2X communication in the present invention is described. Although the present invention is described by being limited to a V2X scenario for clarity of the description, the present invention is applicable to other communication systems such as Device-to-Device (D2D) communication.

Figure 10:
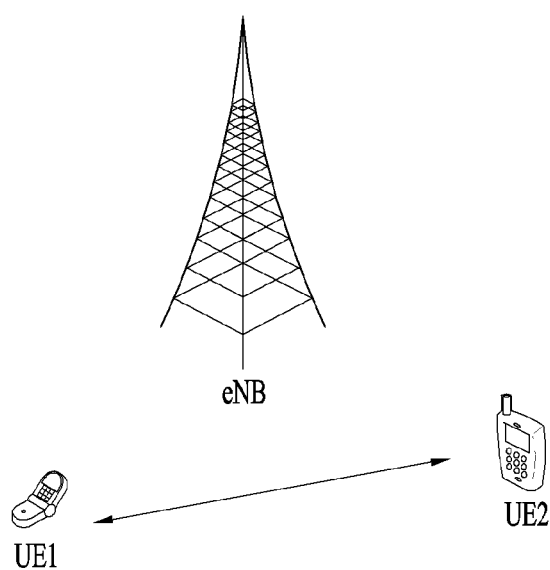
FIG. 10 and FIG. 11 are reference diagrams to describe a resource pool on a D2D scenario.

FIG. 10 is a reference diagram to describe UE-to-UE direct communication. When a UE performs communication with another UE using a direct wireless channel, as shown in FIG. 10, the present invention proposes a method of determining a resource to use for communication. This can be named UE-to-UE direct signal transmission/reception or Device-to-Device (D2D) communication, and further named a sidelink to be distinguished from Downlink (DL) and Uplink (UL) of the existing cellular communication. Furthermore, communication among multiple devices may be named Vehicle-to-Vehicle (V2V) communication in association with vehicles. Hence, although a UE means a user's UE (or car), if a network equipment such as an eNB transmits/receives a signal according to a UE-to-UE communication methodology, the network equipment can be regarded as a sort of UE to which the present invention is applicable. Moreover, an eNB can receive a D2D signal transmitted by a UE. Furthermore, a signal transmitting/receiving method of a UE designed for D2D transmission is applicable to an operation for a UE to transmit data to an eNB.

In the following description, UE1 may operate in a manner of selecting a resource unit corresponding to a specific resource from a resource pool meaning a set of a series of resources and transmitting a D2D signal using the corresponding resource unit. UE2 that is an Rx UE may receive a configuration of a resource pool for the UE1 to transmit a D2D signal and detect a signal of the UE1 within the corresponding resource pool. Here, if the UE1 is in a connection range of a base station, the UE1 can be informed of the resource pool by the base station. If the UE1 is out of the connection range of the base station, the UE1 may be informed of the resource pool by another UE or the resource pool may be determined as a previously determined resource. Generally, a resource pool is configured in a plurality of resource units. Each UE may select a single or a plurality of resource units and use the selected resource unit(s) for D2D signal transmission of its own.

Figure 11:
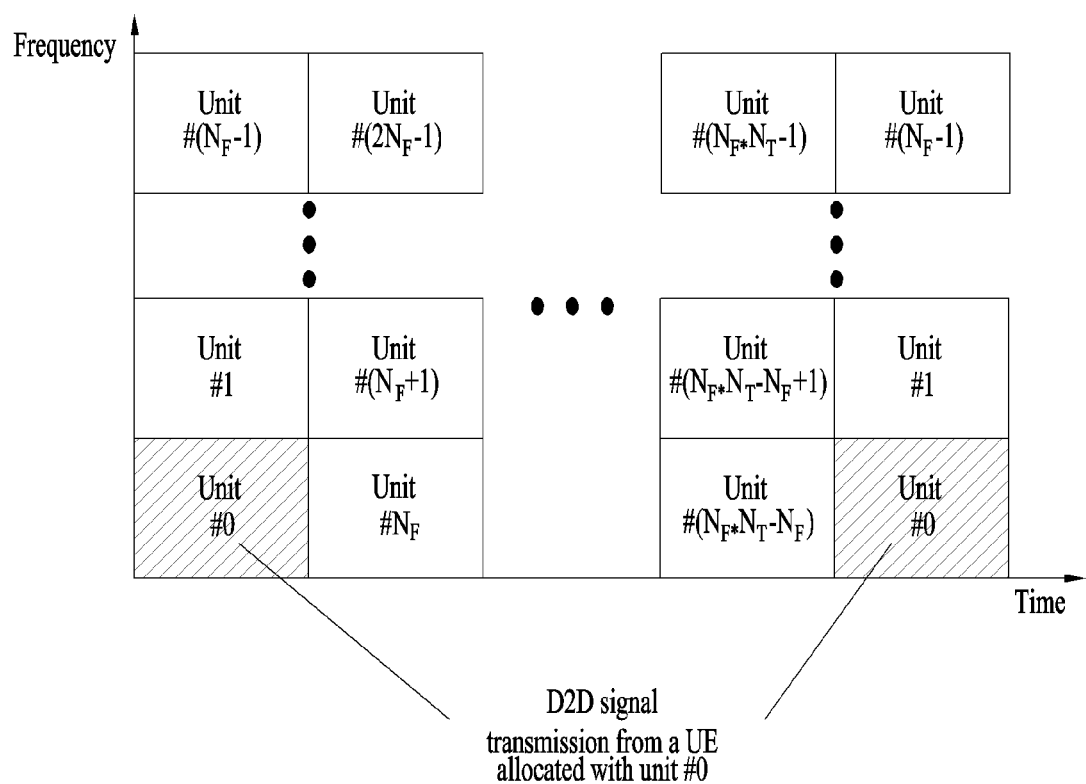

FIG. 11 shows one example of a configuration of resource unit. FIG. 11 illustrates a case that total NF*NT resource units are defined in a manner of dividing a full frequency resource into NF units and dividing a full time resource into NT units. In FIG. 11, a corresponding resource pool is repeated every NT subframes. Typically, as shown in FIG. 11, a single resource unit may appear in a manner of being repeated periodically. Or, an index of a physical resource unit, to which one logical resource unit is mapped to obtain a diversity effect in a time or frequency dimension, may change in a predetermined pattern according to a time. In such a resource unit structure, a resource pool may mean a set of resource units usable for a transmission by a UE intending to transmit a D2D signal.

Furthermore, a resource pool can be subdivided into various types. First of all, a resource pool can be divided according to a content of a transmitted D2D signal in each resource pool. For example, a content of a D2D signal can be classified as follows. And, a separate resource pool may be configured for each content.

Scheduling Assignment (SA) (or sidelink control channel): Signal including information such as a location of a resource used for transmission of a following D2D data channel by each transmitting (Tx) UE, a Modulation and Coding Scheme (MCS) required for demodulation of a data channel, an MIMO transmission methodology and the like. Such an SA signal can be transmitted on the same resource unit by being multiplexed with D2D data. In this case, an SA resource pool may mean a resource pool configured with a resource on which an SA is transmitted by being multiplexed with D2D data.

D2D data channel (sidelink shared channel): A resource pool configured with a resource used in transmitting user data by a Tx UE using a resource designated through SA. If a transmission on the same resource unit by being multiplexed with D2D data is possible, only a D2D data channel of a type except SA information is transmitted in a resource pool for the D2D data channel So to speak, a resource element used in transmitting SA information on an individual resource unit within an SA resource pool is still used to transmit D2D data in a D2D data channel resource pool.

Discovery message (or sidelink discovery channel): A resource pool for a message through which a Tx UE enables an adjacent UE to discover the Tx UE itself by transmitting information such as an ID of the Tx UE and the like.

Synchronization signal/channel (or, sidelink synchronization signal, sidelink broadcast channel): A resource pool for a signal/channel to achieve an object that a Tx UE transmits a synchronization signal and information related to synchronization to enable an Rx (receiving) UE to match up time/frequency synchronization with that of the Tx UE.

Although SA and data may be use a resource pool separated on a subframe, if a UE can simultaneously transmit SA and data in a single frame, two types of resource pools can be configured in the same subframe.

Moreover, in case that the aforementioned D2D signal content is identical, a different resource pool is usable according to a transmission/reception attribute of the D2D signal. For example, despite the same D2D data channel or discovery message, it can be divided into a different resource pool again depending on a transmission timing determining methodology (whether a D2D signal is transmitted at a reception timing of a synchronization reference signal, whether a D2D signal is transmitted by applying a constant timing advance at a repletion timing of a synchronization reference signal, etc.), a resource allocation methodology (e.g., whether a transmission resource of an individual signal is designated to an individual Tx UE by an eNB, or whether an individual Tx UE selects an individual signal transmission resource from a resource pool by itself), a signal format (e.g., the number of symbols occupied in a single subframe by each D2D signal, the number of subframes used for transmission of a single D2D signal), a signal strength from an eNB, a transmit power level of a D2D UE and the like.

For clarity of description, a method for an eNB to directly indicate a transmission resource of a D2D Tx UE in D2D communication is defined as Mode 1. And, a method for a UE to directly select a transmission resource, when a transmission resource region is configured in advance or an eNB designates a transmission resource region, is defined as Mode 2. In case of D2D discovery, a case that an eNB directly indicates a resource is defined as Type 2. And, a case that a UE directly selects a transmission resource from a previously configured resource region or a resource region indicated by an eNB is defined as Type 1.

Moreover, as described above, D2D may be called sidelink, SA may be called Physical Sidelink Control Channel (PSCCH), D2D synchronization signal may be called Sidelink Synchronization Signal (SSS), control channel carrying most basic information, which is transmitted together with SSS before D2D communication, may be called Physical Sidelink Broadcast Channel (PSBCH) or Physical D2D Synchronization Channel (PD2DSCH).

Furthermore, a signal for a specific UE to announce that it is located nearby (here, ID of the specific UE may be included in this signal) or such a channel may be called Physical Sidelink Discovery Channel (PSDCH).

According to Rel. 12 on LTE system, only a D2D communication UE transmits PSBCH together with SSS in D2D, whereby measurement of SSS is performed using DMRS of PSBCH. An out-coverage UE measures DMRS of PSBCH and the determines whether to become a synchronization source by measuring RSRP of this signal and the like.

It is expected that control and data channels coexist in V2X communication. It is assumed that when control and data channels are associated with each other, multiple vehicles transmit periodic messages. Assuming that a vehicle is a UE, the UE may know the resource locations of currently transmitted messages by decoding the control channel or performing energy sensing on the data channel. In addition, the UE may know even the resource locations to be used by other transmitting UEs.

Furthermore, as more and more communication devices require larger communication capacities in transmitting and receiving signals, there is a need for mobile broadband communication improved from the legacy radio access technology (RAT). In addition, massive machine type communications (MTC) capable of providing various services anywhere and anytime by connecting a number of devices or things to each other has been considered as an important issue in the next-generation communication systems. Moreover, a communication system design capable of supporting services/UEs sensitive to reliability and latency has been discussed. Introduction of new-generation RAT considering enhanced mobile broadband communication, massive MTC, ultra-reliable and low-latency communication (URLLC), and the like has been discussed. In the present disclosure, such technologies are referred to as new RAT (NR) for simplicity.

In the present invention, resource selection of a UE during carrier aggregation (CA) in V2X will be described. Hereinafter, for simplicity, description will be given, focusing on the LTE system, but it should be noted that the present invention is also applicable to NR.

Carrier aggregation (CA) is under discussion in Rel-15 LTE V2X. For a UE which is not capable of simultaneous transmission/reception on multiple carriers configured through CA (e.g., intra-band contiguous CA), a method to effectively alleviate the half duplex issue is required. For example, when such a UE performs a transmission operation in subframe n on carrier 1, the UE cannot perform a reception operation on carrier 2 partially overlapping with the corresponding time. In the present invention, "to receive" is interpreted as meaning at least one of "receiving/decoding a control/data channel," "receiving a synchronization signal," "sensing operation (e.g., S-RSRP, S-RSSI)," or "Chanel Busy Ratio (CBR) measurement operation." Alternatively, the present invention may be applied even when not all messages that will be or should be transmitted at a specific time can be transmitted based on a resource region allocated to the UE.

For simplicity, it is supposed that a transmitting UE transmits N messages on N carriers (configured through CA), respectively. The messages may be different from each other, or all or part of the messages may be configured as the same message in consideration of repeated transmission for reliability. The present invention is applicable to all or part of the messages in such a situation. M carriers to which the invention is to be applied are defined as carrier 0, carrier 1, . . . , carrier M−1, and the messages to be transmitted in the respective carriers are defined message 0, message 1, . . . , message M−1.

<First Scheme>

A UE transmits M messages on M carriers at the same time (or different times) (e.g., the same subframe (or different subframes)). That is, by transmitting M messages at the same time, the issue of half duplex is mitigated. Here, since the M messages are transmitted at the same time, a power limit of the UE may become an issue. To alleviate this issue, only a message combination in which the most messages can be sent at the same time without exceeding the power limit may be configured. In general, different powers can be applied to different carriers. Accordingly, limitation configuration according to power limit information may be transmitted on MAC through a higher layer, such that the receiving UE can receive the messages at the same timing.

As an example, when the power limit of the UE is 23 dBM, message 0 needs 20 dBM, message 1 needs 20 dBM, and message 2 needs 23 dBM, message 0 and message 1 may be selected and transmitted while the sum of the powers of the two messages does not exceed 23 dBM. Thereby, the most messages may be sent.

As another example, messages may be selected sequentially/preferentially in a descending order of priority within a range that does not exceed the power limit.

In addition to the power limit, there may be a resource that is not suitable for transmitting a message due to high interference in a sensing result, and thus it may be difficult to transmit messages on the resource at the same time. That is, in the present invention, in the case where signal transmission on the carriers cannot be performed or supported by the UE, the UE may be considered to have a limited transmission (TX) capability, and the present invention is applicable. Therefore, even in this case, only a message combination that can send the most messages among the message combinations may be configured to transmit messages at the same time.

When transmission on a plurality of carriers at the same time exceeds the power limit of the UE, or a sensing quality/interference level of some carrier-related resources is not lower than a predefined threshold, the messages on different carriers may be allowed to be transmitted at different times. Alternatively, when a specific carrier-related message is transmitted, the messages corresponding to the remaining frequency region may be configured to be dropped.

Description has been given above focusing on carriers for simplicity. However, in a case where a predetermined resource unit is allocated, the present invention is applicable when resources are selected based on the TX capability of the UE.

<Second Scheme>

To support the first scheme, the UE may request that the medium access control (MAC) layer transmit minimum sensing results of carriers at a specific time to the physical (PHY) layer.

In LTE Rel. 14, the PHY layer sends resource candidates corresponding to 20% of the resources within a selection window to the MAC layer according to a sensing procedure, and the MAC layer receiving the resource candidates randomly selects a finally reserved resource. According to the present invention, in order to transmit messages on multiple carriers at the same time, the MAC layer may request that the PHY layer send the minimum sensing results of carriers other than a reference carrier at a time (e.g., a subframe) of a resource that is to be used is being used by a message transmitted on the reference carrier.

Here, the reference carrier may be determined as in 1) to 7) below.

1) a predefined carrier or a carrier with a high carrier priority (e.g., a synchronization reference carrier);

2) a carrier with low congestion (e.g., a carrier with a low traffic load) or a carrier with a low measured value of cognitive ratio (CR), or a carrier with high congestion (e.g., a carrier with a high traffic load) or a carrier with a high measured value of CR;

3) a carrier for transmitting a message with a high priority (e.g., a carrier for transmitting a message with a low ProSe per-packet-priority (PPPP), or a carrier for transmitting a message for which short latency/high reliability is required;

4) a carrier on which resource reservation is performed at a long reservation interval, or a carrier on which resource reservation is performed at a short reservation interval;

5) a carrier with a message that is being transmitted first;

6) a randomly selected carrier;

7) a carrier selected according to a predefined rotation pattern.

Further, there may be two or more times (e.g., subframes) for the sensing result.

Accordingly, when the PHY layer has sent the MAC layer minimum resource-related sensing results of the overlapping (or same) time, but the resource-related quality/interference level at the overlapping (or same) time is lower than a preset threshold, the resource at the overlapping (same) time may be excluded, and each resource/time to be used for message transmission may be independently and randomly selected from among the remaining resource candidates reported from the PHY layer for each carrier. For example, messages may be transmitted at the same time/subframe in the initial transmission, but may be transmitted at different times/subframes (e.g., randomly configured times/subframes) in retransmission. Here, as an example, when the first scheme is applied, the PHY layer may inform the MAC layer of a measured interference level (e.g., S-RSRP and S-RSSI) for each resource.

Further, for reasons such as the power limit of the UE described in the first scheme, it may be better in terms of reliability to transmit messages on different carriers at different times. Thus, on the resources except the time (e.g., subframe) of a resource that is to be used or is being used by a message transmitted on the reference carrier (or some messages transmitted at the same time), the MAC layer may request that the PHY layer send a sensing result of 1) carriers other than the reference carrier or ii) carriers other than the carriers for transmission at the same time.

For the requested sensing result, excluding "resources except for the time of a resource that is to be used or is being used by a message transmitted on the reference carrier" may be considered only within 20% of the resources in the selection window transmitted from the PHY layer to the MAC layer according to the sensing procedure defined in Rel-14. Alternatively, the sensing result may not be transmitted. Instead, only resource indexes corresponding to the "resources except for the time of a resource that is to be used or is being used by a message transmitted on the reference carrier" may be selected and transmitted within 20% of the resources in the selection window transmitted from the PHY layer to the MAC layer according to the sensing procedure defined in Rel-14.

Further, for the reference carrier, the above-described reference carrier determination methods 1) to 7) may be used. In addition, sensing results may be excluded at two or more times (e.g., subframes).

In addition, the results of the sensing resources for which a request is made to the PHY layer by the MAC layer as described in the second scheme may be configured (a) to be reported by occupying a portion of 20% of the resources the selection window transmitted from the PHY layer to the MAC layer in Rel-14 (e.g., the information actually reported by the PHY layer cannot be larger than 20% of the resources in the selection window), (b) to be independently reported (e.g., the information actually reported by the PHY layer to the MAC may be larger than 20% of the resources in the selection window), or such that (c) additional sensing result information actually reported to the MAC layer by the PHY layer at the request of the MAC layer only corresponds to 20% of the resources in a selection window derived after the PHY layer independently performs the sensing operation in Rel. 14, or that (d) additional sensing result information requested by the MAC layer is included/occupied as a part in 20% of the resources in the selection window that the PHY layer will report to the MAC layer. Here, when the rule (e.g., (a), (c)/(d)) is applied, the MAC layer may select resources of the same or overlapping time for multiple carriers or resources of different times based on the sensing result information received from the PHY layer (e.g., 20% of the resources in the selection window). For example, in the case of 20% of the resources in the selection window, when the results of four sensing resources are reported, information corresponding to two or three additional sensing results outside 20% of the resources in the selection window may be included.

<Third Scheme>

On behalf of the first scheme, after independently performing the sensing procedure defined in Rel-14 on each carrier, the PHY layer may send the MAC layer resource candidates corresponding to 20% of the resources in a selection window for each carrier. Finally, the MAC layer may (a) randomly select a resource from among the resource candidates(s) for the overlapping (or same) time of the carriers, or (b) select a resource of the overlapping (or same) time with a higher priority.

For example, in (a) a case where there is no resource candidate(s) for the overlapping (or same) time of the carriers or (b) a case where the number/proportion of the resource candidates(s) for the overlapping (or same) time of the carriers is smaller than a preset threshold/proportion (which may be interpreted as meaning, for example, that the third scheme is applied only when the number/proportion is larger than the preset threshold/proportion), each resource (or time) to be used for message transmission may be independently and randomly selected from among the resource candidates reported for each carrier from the PHY layer.

Further, the sensing result described in the present invention may be S-RSRP or S-RSSI of resources, and may refer to only an index of a resource selected after the sensing result.

Figure 12:
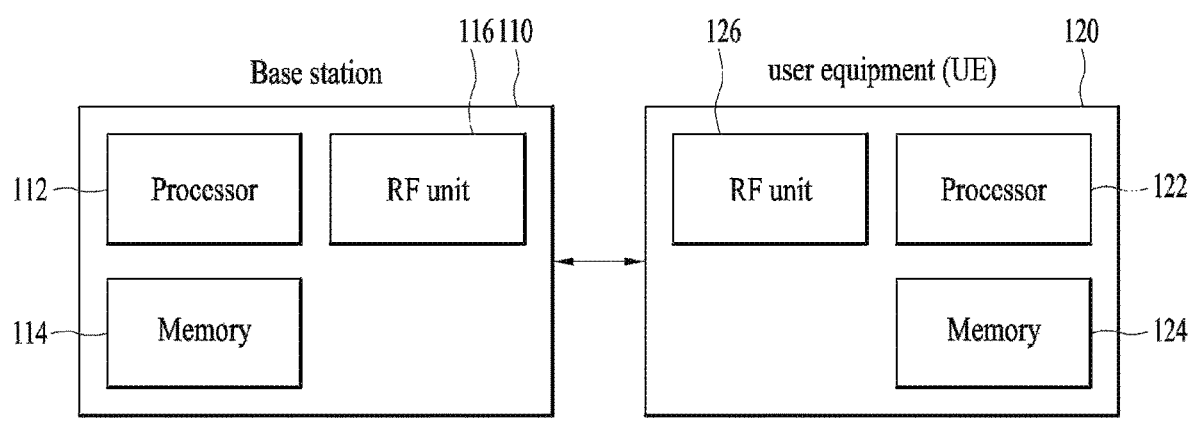
FIG. 12 shows a base station and a user equipment applicable to one embodiment of the present invention.

FIG. 12 illustrates a base station (BS) and a user equipment (UE) applicable to an embodiment of the present invention.

If a relay node is included in a wireless communication system, backhaul link communication is performed between the BS and the relay node, and access link communication is performed between the relay node and the UE. Therefore, the BS or UE shown in the drawing may be replaced with the relay node in some cases.

Referring to FIG. 12, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The resource allocation method and apparatus for the same in the wireless communication system as described above are applicable to various wireless communication systems.

The invention claimed is:

1. A method for allocating resources by a first terminal in a wireless communication system supporting carrier aggregation, the method comprising:
receiving a configuration of a resource pool for signal transmission;
based on a sum of powers of N messages not exceeding a power limits of UE, transmitting the N messages to a second terminal through different N carriers in a first subframe based on the resource pool; and
based on the sum of the powers of the N messages exceeding a power limits of UE, transmitting M messages to the second terminal through different M carriers in the first subframe based on the resource pool, and N-M messages to the second terminal through different N-M carriers in a second subframe different from the first subframe,
wherein the M messages are selected as a message combination that comprises the majority of the N messages, and
wherein each of the N and the M is a natural number, and the M is smaller than the N.

2. The method of claim 1, wherein resources for the N messages are selected based on a ProSe per-packet-priority (PPPP) or a channel busy ratio (CBR).

3. The method of claim 1, wherein resources for the N messages are configured differently according to the N carriers.

4. A first terminal for allocating resources in a wireless communication system supporting carrier aggregation, the first terminal comprising:
a transmitter and a receiver; and
a processor configured to:
receive a configuration of a resource pool for signal transmission;
based on a sum of powers of N messages not exceeding a power limits of UE, transmit the N messages to a second terminal through different N carriers in a first subframe based on the resource pool; and
based on the sum of the powers of the N messages exceeding a power limits of UE, transmit M messages to the second terminal through different M carriers in the first subframe based on the resource pool, and N-M messages to the second terminal through different N-M carriers in a second subframe different from the first subframe,
wherein the M messages are selected as a message combination that comprises the majority of the N messages, and
wherein each of the N and the M is a natural number, and the M is smaller than the N.

5. The terminal of claim 4, wherein resources for the N messages are selected based on a ProSe per-packet-priority (PPPP) or a channel busy ratio (CBR).

6. The terminal of claim 4, wherein resources for the N messages are configured differently according to the N carriers.

* * * * *